(12) United States Patent
Tiruthani

(10) Patent No.: US 7,664,846 B2
(45) Date of Patent: Feb. 16, 2010

(54) SYSTEM AND METHOD FOR DISTRIBUTED MODELING OF REAL TIME SYSTEMS

(75) Inventor: Saravanakumar V. Tiruthani, Santa Clara, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 564 days.

(21) Appl. No.: 10/723,932

(22) Filed: Nov. 26, 2003

(65) Prior Publication Data

US 2005/0114524 A1 May 26, 2005

(51) Int. Cl.
*G06F 15/173* (2006.01)
(52) U.S. Cl. .................................... 709/224
(58) Field of Classification Search ......... 709/223–229, 709/217–219; 703/13–22
See application file for complete search history.

(56) References Cited

U.S. PATENT DOCUMENTS

| | | | | |
|---|---|---|---|---|
| 5,754,831 A * | 5/1998 | Berman | ................ | 703/13 |
| 5,845,124 A * | 12/1998 | Berman | ................ | 703/2 |
| 6,018,625 A * | 1/2000 | Hayball et al. | ................ | 703/22 |
| 6,058,492 A * | 5/2000 | Sample et al. | ................ | 714/33 |
| 6,078,739 A * | 6/2000 | Paterson et al. | ................ | 703/6 |
| 6,223,220 B1 * | 4/2001 | Blackwell et al. | ............ | 709/223 |
| 6,405,106 B1 | 6/2002 | Sheth et al. | | |
| 6,498,565 B2 | 12/2002 | Boulay et al. | | |
| 6,515,595 B1 | 2/2003 | Obradovich et al. | | |
| 6,542,818 B1 | 4/2003 | Oesterling | | |
| 6,553,232 B1 | 4/2003 | Shaffer et al. | | |
| 6,564,127 B1 | 5/2003 | Bauerle et al. | | |
| 6,708,141 B1 * | 3/2004 | Schaff et al. | ................ | 703/2 |
| 6,925,431 B1 * | 8/2005 | Papaefstathiou | ............ | 703/17 |
| 6,996,517 B1 * | 2/2006 | Papaefstathiou | ............ | 703/22 |
| 7,031,895 B1 * | 4/2006 | Takahashi et al. | ............ | 703/13 |
| 7,093,005 B2 * | 8/2006 | Patterson | ................ | 709/220 |
| 7,103,526 B2 * | 9/2006 | Allen et al. | ................ | 703/21 |
| 7,165,017 B2 * | 1/2007 | Paterson et al. | ............ | 703/22 |
| 7,243,054 B2 * | 7/2007 | Rappaport et al. | ............ | 703/2 |
| 7,246,055 B1 * | 7/2007 | Singh | ................ | 703/20 |
| 7,304,984 B2 * | 12/2007 | Butler et al. | ................ | 370/352 |
| 2002/0110113 A1 * | 8/2002 | Wengrovitz | ................ | 370/352 |
| 2003/0005090 A1 * | 1/2003 | Sullivan et al. | ............ | 709/220 |
| 2003/0028863 A1 * | 2/2003 | Reichenthal | ................ | 717/135 |
| 2003/0225563 A1 * | 12/2003 | Gonos | ................ | 703/22 |
| 2004/0107085 A1 * | 6/2004 | Moosburger et al. | ........ | 703/13 |

* cited by examiner

Primary Examiner—Benjamin R Bruckart

(57) ABSTRACT

A system for modeling real time systems includes a plurality of modules for modeling components of a system. Each module represents a single component of the system or other systems that compete for system resources. In one embodiment, each module is XML-based. Each module can also include instructions to log appropriate transactions. The system creates the loads and delays which are then logged for later analysis.

15 Claims, 4 Drawing Sheets

SYSTEM AND METHOD FOR DISTRIBUTED MODELING OF REAL TIME SYSTEMS

FIELD OF THE INVENTION

The present invention relates to realtime systems and, in particular, to an improved system and method for modeling the performance and delay characteristics of realtime communications systems.

BACKGROUND OF THE INVENTION

Realtime systems and, in particular, realtime telecommunications systems are becoming increasingly complex. System delay and system load are important performance criteria. During system development, simulation tools are sometimes used to simulate load and delay.

However, such simulation tools can be disadvantageous in that each component must be separately simulated. Furthermore, to accurately determine system load and delay, other software applications and systems overhead should be taken into account. As can be appreciated, the more accurate a simulation is desired, the more complex the simulation itself must be.

As such, there is a need for an improved system and method for validating real-time system architecture. In particular, there is a need for an improved system and method for validating a real-time telecommunication system.

SUMMARY OF THE INVENTION

These and other drawbacks in the prior art are overcome in large part by a system and method according to embodiments of the present invention.

A system for modeling real time systems includes a plurality of modules for modeling components of a system. Each module represents a single component of the system or other systems that compete for system resources. In one embodiment, each module is defined by an XML-based script. The scripts describe the communication, load and delay behavior of the modules. Using the script, a module can originate, receive or forward messages, while introducing specified load and delay. Furthermore, the scripts can also include instructions to log the messages that contain the history of delays introduced at different modules.

A better understanding of these and other specific embodiments of the invention is obtained when the following detailed description is considered in conjunction with the following drawings.

DETAILED DESCRIPTION OF EMBODIMENTS OF THE INVENTION

Telecommunications System Overview

Figure 1:
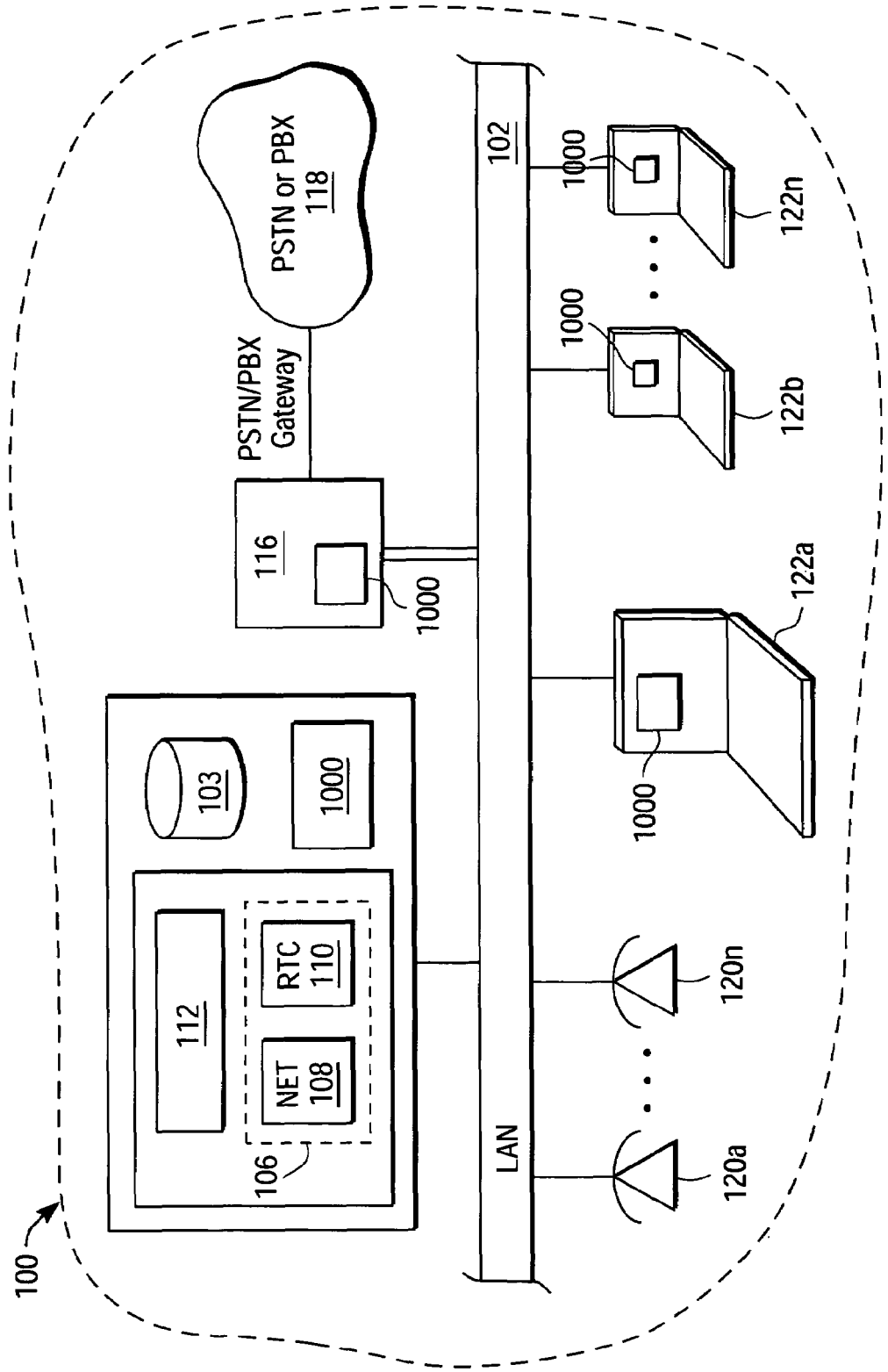
FIG. 1 is a diagram illustrating a telecommunication system that can be modeled using the embodiment of the present invention.

Turning now to the drawings and, with particular attention to FIG. 1, a diagram of an exemplary system 100 suitable for modeling and including a modeling system according to an embodiment of the present invention is shown. It is noted that while a particular telecommunications system is shown, the modeling system of the present invention is suitable for modeling a variety of systems; thus, the figures are exemplary only. As shown, the telecommunications system 100 includes a local area network (LAN) 102. The LAN 102 may be implemented using a TCP/IP network and may implement voice or multimedia over IP using, for example, the Session Initiation Protocol (SIP). Operably coupled to the local area network 102 is a server 104. The server 104 may include one or more controllers 101, which may be embodied as one or more microprocessors, and memory 103 for storing application programs and data. In certain embodiments, the controller 101 implements an instant messaging system 106. The instant messaging system may be embodied as Microsoft Windows Messenger or other instant messaging system. Thus, according to certain embodiments of the present invention, the instant messaging system 106 implements the Microsoft .Net environment 108 and Real Time Communications protocol (RTC) 110.

Also coupled to the LAN 102 is a gateway 116 which may be implemented as a gateway to a private branch exchange (PBX), the public switched telephone network (PSTN) 118, or any of a variety of other networks, such as a wireless or cellular network. In addition, one or more LAN telephones 120a-120n and one or more computers 122a-122n may be operably coupled to the LAN 102.

The computers 122a-122n may be personal computers implementing the Windows XP operating system and thus, Windows Messenger. In addition, the computers 122a-122n may include telephony and other multimedia messaging capability using, for example, peripheral cameras, microphones and speakers (not shown) or peripheral telephony handsets 124. In other embodiments, one or more of the computers may be implemented as wireless telephones, digital telephones, or personal digital assistants (PDAs). Thus, the figures are exemplary only. As shown with reference to computer 122a, the computers may include one or more controllers 129, such as Pentium-type microprocessors, and storage 131 for applications and other programs.

Finally, the computers 122a-122n, as well as the other network devices, such as the server 104, may implement modeling tool systems 1000 according to embodiments of the present invention. As will be described in greater detail below, the modeling tools 1000 allow for distributed modeling of various components of the telecommunication system 100. In particular, the modeling system 1000 implements a message driven modeling that creates actual load in terms of CPU, memory, I/O and thread/process/kernel context switching and paging. As will be explained in greater detail below, a model definition language is used to define the behavior of each module of the system, and provides a message and log structure that allows the history of message traversal to be through various modules to be recorded and analyzed. Delay characteristics can be analyzed based on a collection of message exchanges. Modules may be selectively distributed on different systems, e.g., on various servers or network components.

Figure 2:
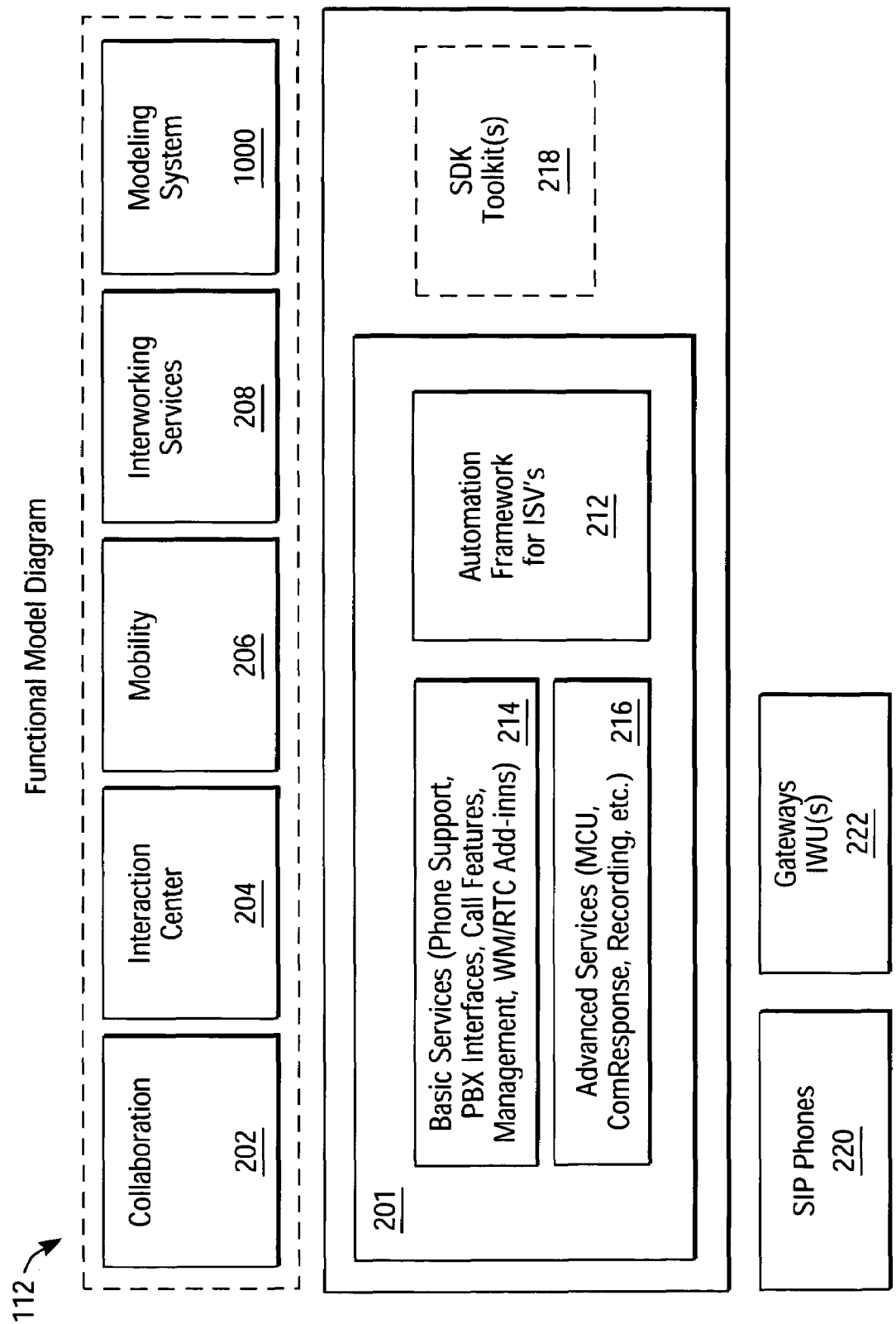
FIG. 2 is a diagram illustrating a telecommunications collaboration system according to an embodiment of the present invention.

Turning now to FIG. 2, a functional model diagram illustrating an exemplary server having components that may be modeled is shown. More particularly, FIG. 2 is a logical diagram illustrating a particular embodiment of a multimedia server 104, which may include one or more components that may be modeled using the modeling system of embodiments of the present invention. The server 104 includes a plurality of application modules 202, etc., and a communication broker module 201. One or more of the application modules and communication broker module 201 may include an inference engine, i.e., a rules based artificial intelligence engine for implementing functions according to the present invention, as will be described in greater detail below. In addition, the server 104 provides interfaces, such as APIs (application programming interfaces) to SIP phones 220 and gateways/interworking units 222.

According to the embodiment illustrated, the broker module 201 includes a basic services module 214, an advanced services module 216, an automation module 212, and a toolkit module 218.

The basic services module 214 functions to implement, for example, phone support, PBX interfaces, call features and management, as well as Windows Messaging and RTC add-ins, when necessary. The phone support features allow maintenance of and access to buddy lists and provide presence status.

The advanced services module 216 implements function such as presence, multipoint control unit (MCU), recording, and the like. MCU functions are used for voice conferencing and support ad hoc and dynamic conference creation from a buddy list following the SIP conferencing model for ad hoc conferences. In certain embodiments, support for G.711 and G.723.1 codecs is provided. Further, in certain embodiments, the MCU can distribute media processing over multiple servers using the MEGACO protocol.

Presence features provide device context for both SIP registered devices and user-defined non-SIP devices. Various user contexts, such as In Meeting, On Vacation, In the Office, etc., can be provided for. In addition, voice, e-mail and instant messaging availability may be provided across the user's devices. The presence feature enables real time call control using presence information, e.g., to choose a destination based on the presence of a user's devices. In addition, various components have a central repository for presence information and for changing and querying presence information. In addition, the presence module provides a user interface for presenting the user with presence information.

In addition, the broker module 201 may include the ComResponse platform, available from Siemens Information and Communication Networks, Inc. ComResponse features include speech recognition, speech-to-text, and text-to-speech, and allow for creation of scripts for applications.

In addition, real time call control is provided by a SIP API 220 associated with the basic services module 214. That is, calls can be intercepted in progress and real time actions performed on them, including directing those calls to alternate destinations based on rules and or other stimuli. The SIP API 220 also provides call progress monitoring capabilities and for reporting status of such calls to interested applications. The SIP API 220 also provides for call control from the user interface.

According to the embodiment illustrated, the application modules include a collaboration module 202, an interaction center module 204, a mobility module 206, an interworking services module 208, and can also include a modeling system module 1000.

The collaboration module 202 allows for creation, modification or deletion of a collaboration session for a group of users. The collaboration module 202 may further allow for invoking a voice conference from any client. In addition, the collaboration module 202 can launch a multi-media conferencing package, such as the WebEx package. It is noted that the multi-media conferencing can be handled by other products.

The interaction center 204 provides a telephony interface for both subscribers and guests. Subscriber access functions include calendar access and voicemail and e-mail access. The calendar access allows the subscriber to accept, decline, or modify appointments, as well as block out particular times. The voicemail and e-mail access allows the subscriber to access and sort messages.

Similarly, the guest access feature allows the guest access to voicemail for leaving messages and calendar functions for scheduling, canceling, and modifying appointments with subscribers. Further, the guest access feature allows a guest user to access specific data meant for them, e.g., receiving e-mail and fax back, etc.

The mobility module 206 provides for message forwarding and "one number" access across media, and message "morphing" across media for the subscriber. Further, various applications can send notification messages to a variety of destinations, such as e-mails, instant messages, pagers, and the like. In addition, the subscriber can set rules that the mobility module 206 uses to define media handling, such as e-mail, voice and instant messaging handling. Such rules specify data and associated actions. For example, a rule could be defined to say "If I'm traveling, and I get a voicemail or e-mail marked Urgent, then page me."

Function of the modeling system and module 1000 is explained in greater detail below; various functions of the modules described above may be modeled using the system 1000.

System Function

Figure 3:
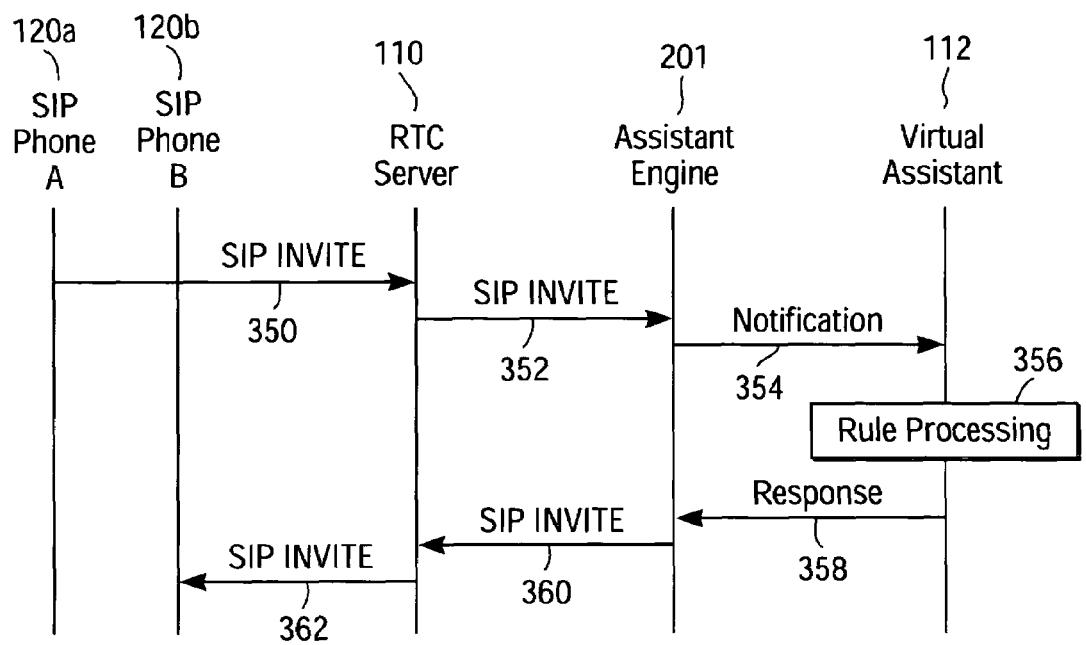
FIG. 3 is a diagram illustrating function of an exemplary modeled system according to an embodiment of the present invention.

Turning now to FIG. 3, a signaling diagram illustrating exemplary function which is modeled by the present invention is shown. In particular, handling of a SIP invite request by an embodiment of the present invention is shown. It is noted that other functions, such as other packet network telephony and system-load related functions also may be modeled. Illustrated are a SIP phone 120a, a SIP phone 120b, RTC server 110, and interfaces including an assistant engine (e.g., communication broker) 201, and virtual assistant (e.g., applications program) 112.

In certain embodiments, the virtual assistant 112 is a component that allows the subscriber to control the processing of a communication session. A communications session may be a single phone call, an email or an instant message session. A set of rules called priority profiles are called into play when any session associated with the subscriber, outbound or inbound, occurs. The virtual assistant 112 is aware of the devices associated with the user. These can include registered devices (SIP phones and clients registered to the user) and associated devices (mobile phones or home phones). The Assistant 112 uses the Priority Profiles and information about the presence of the users and the availability of their devices (registered and associated) to connect sessions to the user using the appropriate device.

The virtual assistant 112 also allows the user to create and manage collaborative sessions. Collaboration groups can be set up once and remain persistent over multiple voice or multimedia conferencing sessions. Each collaboration can have a data storage area the contains documents and files that collaboration members may wish to access before, during, or after the voice conference. Collaborations include definition of participants, storage and/or retrieval of associated documents, and notification to users.

In one embodiment, the Assistant Engine 201 component provides an application programming interface on top of the SIP protocol stack (not shown). This application programming interface is based on the industry standard ECMA-323 (a.k.a. CSTA 3 XML) and acts on SIP messages to translate the SIP messages to CSTA-3 events. It also accepts CSTA-3 requests, and generates SIP messages to implement the requests. This functionality allows a CSTA-3 application such as the Virtual Assistant 112 to influence the handling of a session. The use of CSTA-3 also opens up the opportunity to adapt and re-use a wide range of enterprise communication applications available on CSTA, such as CRM, ERP, and eCommerce applications. SIP is still the signaling protocol on the wire; therefore, interoperability with SIP devices is maintained.

Typically, as noted above, the RTC server, assistant engine, and virtual assistant may be run on the same computer, along with a web server and database (not shown).

In operation, the SIP phone A 120a issues a SIP Invite request at 350. The RTC server 110 receives the SIP invite and forwards it to the assistant engine 201 at 352. The assistant engine 201 notifies the virtual assistant, at 354. The virtual assistant processes the message at 356, and responds, at 358. The assistant engine 201 then issues its SIP invite, at 360. The RTC server then forwards this to the SIP phone B 120b, at 362.

Modeling System

As can be appreciated, a system can include a large number of SIP phones; all the server components can experience loads and delays resulting from simultaneous attempts to access system resources such as CPU and memory. A modeling system of the present invention allows measurement of load and delay characteristics by simulating the behavior of individual modules.

Figure 4:
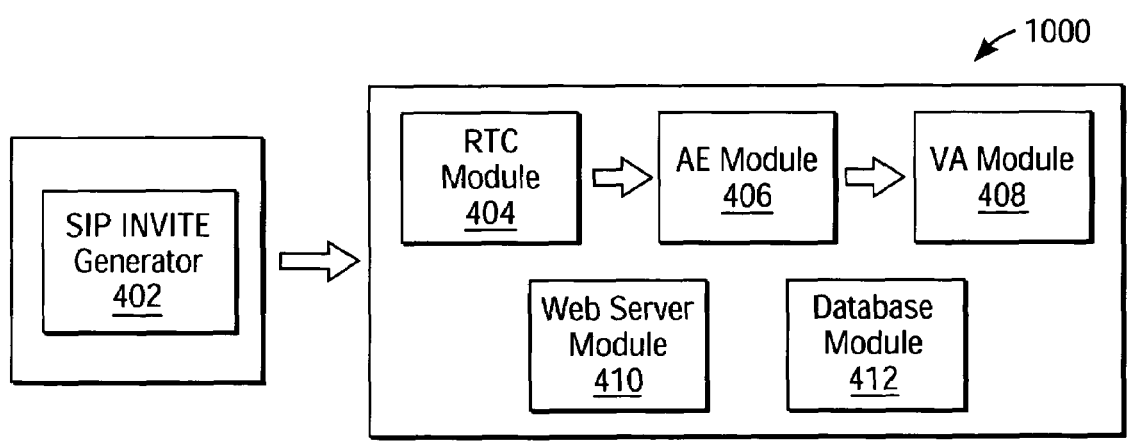
FIG. 4 is a diagram illustrating an exemplary modeling system according to an embodiment of the present invention.

FIG. 4 illustrates an exemplary system for modeling the SIP invite call setup described above. Shown are a SIP Invite generator 402, an RTC module 404, an Assistant Engine (AE) module 406, a Virtual Assistant (VA) module 408, a web server module 410, and a database module 412. The SIP_INVITE generator module generates SIP INVITE messages at a rate specified in the module script. The messages are sent to RTC Module 404. The RTC Module 404 introduces load and delay for every message as specified in the script and passes the message to AE Module. Similarly, the message is passed to VA Module 408, which sends back the SIP_INVITE message to the AE Module 406. The scripts redirect the message through the same path. The SIP INVITE Generator 402 script logs the message when it reaches the generator. The log contains the time stamps that can be analyzed to measure the delay characteristics. Web Sever Module and Database Modules do not process the messages but consume a specified amount of CPU/Memory resources at a rate specified in the script.

More particularly, the operation and interaction of the various server and network wide components can be important. As such, the modeling system of the present invention provides distributed modules that may include database logs, as will be explained in greater detail below.

Figure 5:
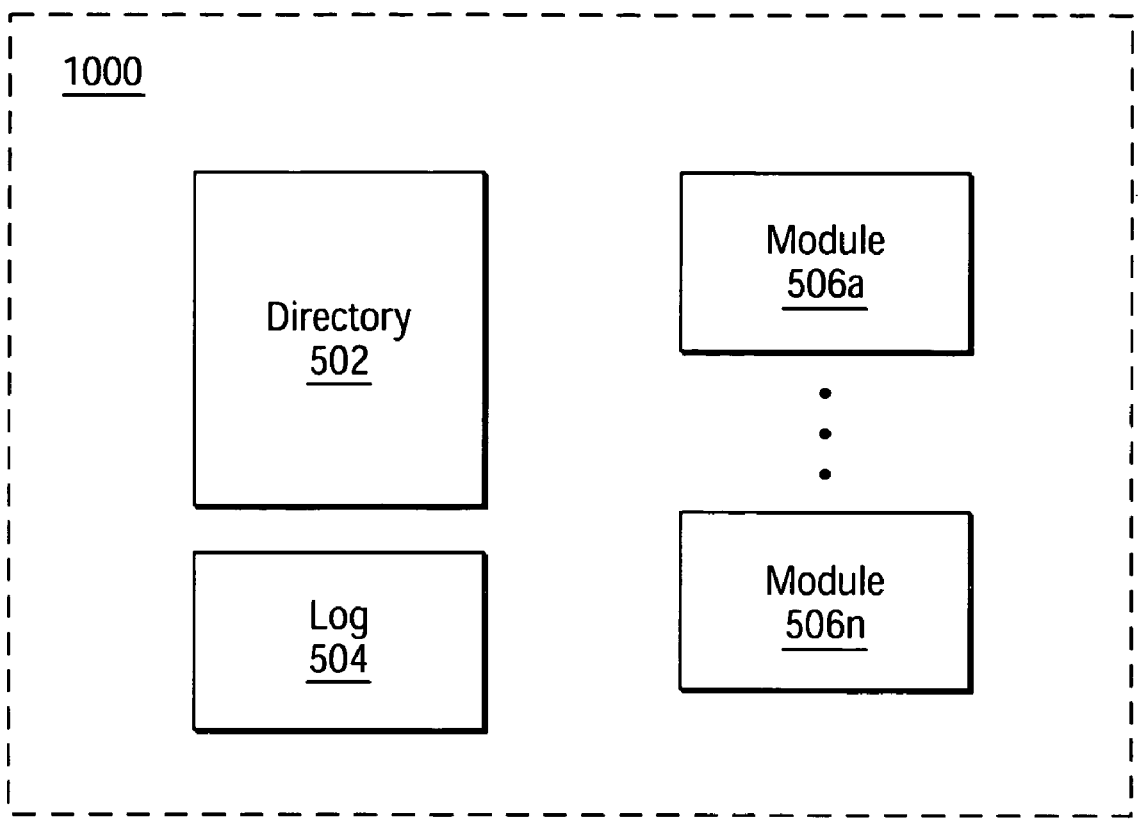
FIG. 5 is a diagram illustrating an exemplary modeling system according to an embodiment of the present invention.

FIG. 5 is a diagram schematically and more generally illustrating a modeling system 1000 at a particular network device. The system 1000 implements a directory 502, a log file 504, and one or more modules 506a-506n.

"Module" refers to each instance of the modeling system. A module 506 represents a Real-Time system component. The behavior of the module is defined using a Module Definition Language (MDL) in an MDL file. The modules that model the Real-Time Communication system can be all running on the same system or on different systems.

Each module 506 requires the name and the location of other modules that it needs to interact. Thus, the various modules may be distributed across the system. The modules 506 get the name and location information from the directory 502 provided to the module during startup.

In operation, the user defines a module 506 using the module definition language of the present invention.

An executable (motors.exe) takes two mandatory arguments as shown below:

MOTORS.EXE <MDL file> <directory configuration file>

The argument <MDL file> defines the module 506, and the argument <directory configuration file> defines the contents of the directory 504, as will be explained in greater detail below.

Module Definition Language

The Module Definition Language (MDL) of embodiments of the present invention is an XML based language that defines a set of elements and attributes for definition the behavior of the module.

Each MDL file starts with the following XML definition, followed by <MDLScript> as shown below:

```
<?xml version="1.0" encoding="utf-8"?>
<MDLScript>
</MDLScript>
```

MDLScript Tag

The <MDLScript> tag defines the entire module definition. The Module tag takes the following attributes:

| Attribute | Description |
| --- | --- |
| Name | Name of the module. If not specified, the default name is constructed from the hostname and the port number |
| Port | Port number on which the module will be listening for new messages. The default value is set to 10000. Each module may require a different port number. |
| Threads | Number of threads that will be used in this module. Current version supports ThreadPooling, where the Operating System allocates the threads (up to a predetermined maximum). |

For example the following script defines a module called "RTC" client starting at port 10001.

```
<MDLScript><Module Name="RTCClient" Port="10001">
</MDLScript>
```

Each <MDLScript> tag contains one or more <OnMessage> sub tags. The <OnMessage> subtag defines a rule that contains the name of a message and the action to be taken on the arrival of the message. Each <On Message> tag takes the following attributes:

| Attribute | Description |
| --- | --- |
| Message | Name of the message<br>On arrival of this message, the actions associated with the current OnMessage will be executed |
| FromModule | Name of the module from where the message was received |
| FromHost | Name of the host from where the message was received |

Each <OnMessage> contains zero or more actions as defined by the sub tags <Delay>, <Forward>, <Create> and record.

The <Delay> tag causes the module to introduce specified amount of CPU load and delay. Each <Delay> tag supports the following attributes.

| Attribute | Description |
| --- | --- |
| CPU | Load on the CPU specified in milliseconds |
| Wait | Wait time for processing this message specified in milliseconds |
| PDF | Probability Distribution Function<br>The PDF specifies the probability distribution of the delay values<br>$Exp: Exponential<br>$None: Constant (Default)<br>$Gamma: Gamma or Normal distribution |

The <Forward> tag specifies that the message has to be forwarded. The <Forward> tag takes the following attributes.

| Attribute | Description |
| --- | --- |
| Module | Name of the module to which the message has to be forwarded.<br>The default is set to the same module that is executing the script.<br>The message is discarded if there is no module with the specified name. |
| Host | Name of the host where the destination module is located (default is the same host where the script is running)<br>The message is discarded if there is no host with the specified name. |

The <Create> tag creates a new message. The <Create> tag takes the following attributes.

| Attribute | Description |
| --- | --- |
| Message | Name of the message |
| Module | Name of the module to which the created message has to be sent.<br>The default is set to the same module that is executing the script<br>The message is discarded if there is no module with the specified name. |
| Host | Name of the host where the destination module is located (default is the same host where the script is running).<br>The message is discarded if there is no host with the specified name. |
| NewSession | Boolean value (true or false). When set to true, the created message will have a new sessionId. When set to false, the created message will have the sessionId of the message that triggered the creation of this message. |

The <Record> tag records the message. The <Record> has no attributes.

Predefined Constants

The following predefined constants have specific meaning in the Module Definition Language.

| Predefined Constant | Meaning and the applicable context |
| --- | --- |
| $Begin | $Begin is a built in message that is posted when the module starts. The MDL script may use this message for driving load or message generation |
| $Any | $Any acts as a wildcard for specifying the message, module or host in the OnMessage element.<br>This value should not be used in any of the action commands to specify the destination module or host. |
| $Default | $Default specifies the default value of an attribute. The same effect is achieved by simply not specifying the attribute. The use of this constant has to be avoided, since the support may be removed in later versions. |
| $Self | $Self refers to the current module name or host name. Leaving the module or host destination attribute has the same effect. |
| $All | $All refers to all the modules or all the hosts configured in the directory configuration file.<br>$All can be specified as the destination module or host or both for Forward and Create Actions.<br>$All should be used with care since using $All can create a flood of messages |
| $End | The modules stop when they receive "$End" message is received.<br>Any module can send "$End" message to any other modules. |
| $Exp | Exponential Distribution<br>This value can be specified as the value of PDF attribute in a Delay action |
| $Gamma | Gamma or Normal Distribution<br>An approximated version of Gamma/Normal distribution that can be specified as the value of PDF attribute in a Delay action |

Directory Configuration Tag

The directory configuration file contains the addresses of all the modules. The directory configuration follows the structure shown in the example below:

```
<?xml version="1.0" encoding="utf-8"?>
<Directory xmlns:xsd="http://www.w3.org/2001/XMLSchema"
xmlns:xsi="http://www.w3.org/2001/XMLSchema-instance">
<Address>
<Module>DestClient</Module>
<Host>COMO</Host>
<Port>10001</Port>
</Address>
<Address>
<Module>OrigClient</Module>
<Host>COMO</Host>
<Port>10000</Port>
</Address>
</Directory>
```

The directory is defined by the <Directory> tag, which in turn contains zero or more addresses. Each module is represented by an <Address> element. The <Address> element in turn contains <Module>, <Host> and <Port> that specify the name of the module, name of the host and the port number respectively.

Log Structure

A log file includes message logs as illustrated in the following sample.

```xml
<?xml version="1.0"?>
<Log>
    <Message Name="180" SessionId="INVITE:OrigClient:como:2" MessageId="180:DestClient:como:1">
        <CurrentDelay Message="180" Module="OrigClient" ServiceTime="70" CPU="0" Wait="0" />
        <History Message="INVITE" Module="OrigClient" ServiceTime="0" CPU="0" Wait="0" />
        <History Message="180" Module="DestClient" ServiceTime="0" CPU="0" Wait="0" />
    </Message>
    <Message Name="180" SessionId="INVITE:OrigClient:como:3" MessageId="180:DestClient:como:2">
        <CurrentDelay Message="180" Module="OrigClient" ServiceTime="100" CPU="0" Wait="0" />
        <History Message="INVITE" Module="OrigClient" ServiceTime="0" CPU="0" Wait="0" />
        <History Message="180" Module="DestClient" ServiceTime="0" CPU="0" Wait="0" />
    </Message>
</Log>
```

Each message structure has following attributes:

| Attribute | Description |
| --- | --- |
| Name | Name of the message |
| MessageId | Unique Id for every message |
| Hop | Number of hops after which the message will be discarded |
| Module | The name of the module from where the message was received |
| Host | The name of the host from where the message was received |
| SessionId | Unique Id of the session |

The <Message> tag has following sub tags:
1) <CurrentDelay>
2) <History>

The <CurrentDelay> specifies the delay introduced by the recording module at the time of recording the message. The <CurrentDelay> has following attributes:

| Attribute | Description |
| --- | --- |
| ServiceTime | Time elapsed since the arrival of the message and the recording of the message (in milliseconds) |
| CPU | Total CPU load introduced by the recording module (in milliseconds) |
| Wait | Total Wait time introduced by the recording module (in milliseconds) |
| Message | Name of the message. |
| Module | Name of the module where the delay is introduced |
| Host | Name of the host where the module was running |

The <History> specifies the delays introduced by all the modules that a message has passed through. The <History> tag supports the same set of attributes as <CurrentDelay>. When "CopyHistory" is enabled in Create action, the history will include the history of the message that created the current message. Thus it will be possible to trace the history of a session by looking at the history of a single message.

EXAMPLES

Simple Loop

This example demonstrates a module that simply generates a CPU load of 100 ms at every second. The wait time of 900 is chosen to keep the total interval to 1000 ms. The loop will continue up to DefaultMaxHops. This module does not generate any log file. A simple loop module is ideal for modeling non-real-time components in the system (like database) More complex models can be created by combining the simple constructs. For example, a module can generate multiple messages to different modules, thus mimicking the ripple effect seen in real-time communication systems.

```xml
<?xml version="1.0" encoding="utf-8"?>
<MDLScript xmlns:xsd="http://www.w3.org/2001/XMLSchema"
    xmlns:xsi="http://www.w3.org/2001/XMLSchema-instance"
    Name="SimpleLoop1" Port="10000">
    <OnMessage Message="$Begin">
        <Delay CPU="100" Wait="900"/>
        <Forward/>
    </OnMessage>
</MDLScript>
```

Simple Loop with Variable Load and Delay

The following example shows a module that generates variable CPU load and Delay conforming to the specified probability distribution function.

```
<?xml version="1.0" encoding="utf-8"?>
<Module xmlns:xsd="http://www.w3.org/2001/XMLSchema"
xmlns:xsi="http://www.w3.org/2001/XMLSchema-instance"
Name="SimpleLoop2" Port="10000">
   <OnMessage Message="$Begin">
      <Delay CPU="100" Wait= "900" PDF="$Exp"/>
      <Forward/>
   </OnMessage>
</Module>
```

Message Generator

The following example, corresponding to FIG. 4, shows a module (OrigClient) that generates a specific message ("INVITE") and sends it to another module (DestClient). The messages are generated once every second. It is noted that, while illustrated with a SIP INVITE message, other messages may similarly be modeled.

```
<?xml version="1.0" encoding="utf-8"?>
<Module xmlns:xsd="http://www.w3.org/2001/XMLSchema"
xmlns:xsi="http://www.w3.org/2001/XMLSchema-instance"
Name="OrigClient" Port="10000">
   <OnMessage Message="$Begin" Module="OrigClient" >
      <Create Message="Pulse" NewSession="true" Hop="5"/>
   </OnMessage>
   <OnMessage Message="Pulse" Module="OrigClient" >
      <Delay Wait="1000" />
      <Forward/>
      <Create Message="INVITE" Module="DestClient"/>
   </OnMessage>
</Module>
```

Each "INVITE" message has a unique messageId and the sessionId of the "$Begin" message (The messageIds and sessionIds are visible when the messages are logged).

Message Log

The following example shows a module (DestClient) that receives any message, from any module, from any host and logs it.

```
<?xml version="1.0" encoding="utf-8"?>
<Module xmlns:xsd="http://www.w3.org/2001/XMLSchema"
xmlns:xsi="http://www.w3.org/2001/XMLSchema-instance"
Name="DestClient" Port="10001">
   <OnMessage>
      <Record/>
   </OnMessage>
</Module>
```

Message Log (Specific Message & Module)

The following example shows a module (DestClient) that receives a specific message ("INVITE") from a specific module ("OrigClient") and logs it.

```
<?xml version="1.0" encoding="utf-8"?>
<Module xmlns:xsd="http://www.w3.org/2001/XMLSchema"
xmlns:xsi="http://www.w3.org/2001/XMLSchema-instance"
Name="DestClient" Port="10001">
   <OnMessage Message="INVITE" Module="OrigClient">
      <Record/>
   </OnMessage>
</Module>
```

Message Log (Specific Host)

The following example shows a module (DestClient) that receives a specific message ("INVITE") from a specific module ("OrigClient") from a specific host ("COMO") and logs it.

```
<?xml version="1.0" encoding="utf-8"?>
<Module xmlns:xsd="http://www.w3.org/2001/XMLSchema"
xmlns:xsi="http://www.w3.org/2001/XMLSchema-instance"
Name="DestClient" Port="10001">
   <OnMessage Message="INVITE" Module="OrigClient"
   Host="como">
      <Record/>
   </OnMessage>
</Module>
```

Session Generator

The earlier example showed a message generator module. All the messages generated belonged to the same session. The following example shows how to generate sessions.

```
<?xml version="1.0" encoding="utf-8"?>
<Module xmlns:xsd="http://www.w3.org/2001/XMLSchema"
xmlns:xsi="http://www.w3.org/2001/XMLSchema-instance"
Name="OrigClient" Port="10000">
   <OnMessage Message="$Begin" Module="OrigClient" >
      <Create Message="Pulse" NewSession="true" Hop="5"/>
   </OnMessage>
   <OnMessage Message="Pulse" Module="OrigClient" >
      <Delay Wait="1000" PDF="$Exp"/>
      <Forward/>
      <Create Message="INVITE" NewSession="true"
      Module="DestClient"/>
   </OnMessage>
</Module>
```

Each "INVITE" message has a unique message Id and session Id.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications method, comprising: defining one or more system components as corresponding distributed modules using a module definition language;

defining one or more function parameters for said one or more system components, the function parameters defining behavior of each system component in the system and a message and log structure for recording and analyzing the history of message traversal through various other ones of said one or more system components;

implementing in each of said one or more system components the function defined for the respective system component;

generating SIP INVITE messages at a rate specified in a respective module definition;

introducing load and delay in a Real Time Communications protocol (RTC) module for each of said SIP INVITE messages as specified in the respective module definition;

receiving said SIP INVITE messages from said RTC module at an Assistant Engine (AE) module, said AE module generating a CSTA notification for each of said SIP INVITE messages from said RTC module;

receiving CSTA notifications at a Virtual Assistant (VA) module, said VA module processing received said CSTA notifications and returning CSTA responses to said AE module; generating SIP INVITE messages for said CSTA responses and returning said generated SIP INVITE messages to the SIP INVITE generator through said RTC module; and logging in each of said one or more system components a result of said implementing, the module definition language including an MDLScript tag.

2. A telecommunications method in accordance with claim 1, wherein said defining said one or more system components and said one or more function parameters are implemented on a plurality of system components.

3. A telecommunications method in accordance with claim 1, wherein said one or more function parameters comprise CPU delay.

4. A telecommunications method in accordance with claim 1, wherein said one or more function parameters comprise CPU load.

5. A telecommunications system, comprising:

a network;

a plurality of network devices coupled to said network; and a modeling system for modeling functions of said network and said one or more network devices, said modeling system adapted to be distributed among said one or more network devices using modules defining real-time system components, at least two of said plurality of network devices including said modeling system, said modules defining behavior of each real-time system component in the telecommunications system and a message and log structure for recording and analyzing the history of message traversal through various other system components, the modules defined in a module definition language including an MDLScript tag, wherein at least one of said plurality of network devices is a SIP device;

a SIP Invite generator generating SIP INVITE messages at a rate specified in the module definition;

a Real Time Communications protocol (RTC) module receiving said SIP INVITE messages from a said SIP Invite generator, said RTC module introducing load and delay for every SIP INVITE message as specified in the module definition;

an Assistant Engine (AE) module receiving said SIP INVITE messages from said RTC module and generating CSTA notifications for said SIP INVITE messages from said RTC module;

a Virtual Assistant (VA) module receiving said CSTA notifications from said AE module and processing received said CSTA notifications, said VA module returning CSTA responses to said AE module, said AE module generating a SIP INVITE message for each of said CSTA responses, the SIP INVITE message being returned to the SIP INVITE generator through said RTC module, said SIP INVITE generator logging returned messages in a log, the log containing returned message time stamps;

a web server module; and a database module, said web sever module and said database module consuming CPU/Memory resources at a rate and amount specified in said module definition.

6. A telecommunications system in accordance with claim 5, said plurality of network devices includes said modeling system.

7. A telecommunications system, in accordance with claim 6, said modeling system adapted to model one or more system components using an XML-based model definition language.

8. A telecommunications system in accordance with claim 7, said modeling system including one or more modules, each module defining a system component.

9. A telecommunications system in accordance with claim 7, wherein said modeling system models system delay.

10. A telecommunications system in accordance with claim 7, wherein said modeling system models system load.

11. A telecommunications system, comprising:

a network;

a plurality of network devices coupled to said network;

a Real Time Communications protocol (RTC) module receiving messages from and passing messages to said plurality of network devices;

a Virtual Assistant (VA) module processing received CSTA notifications and providing CSTA responses;

an Assistant Engine (AE) module interfacing said RTC module and said VA module, said AE module generating CSTA notifications from incoming RTC messages and outgoing RTC messages from CSTA responses; and a modeling system for modeling functions of said network and said one or more network devices, said modeling system defining modules adapted to be distributed among said one or more network devices, at least two of said plurality of network devices including said modeling system, said modeling system including an XML-based modeling language for defining said modules, each including models of one or more system components and defining behavior of each system component in the telecommunications system and a message and log structure for recording and analyzing the history of message traversal through various other system components, the modules defined in a module definition language including an MDLScript tag, wherein at least one of said plurality of network devices is a SIP device;

a SIP Invite generator generating SIP INVITE messages at a rate specified in the module definition and sending generated SIP INVITE messages to said RTC module, said RTC module introducing load and delay for every SIP INVITE message as specified in the module definition and passing the SIP INVITE message to said AE module, said AE module passing the SIP INVITE message to said VA module, said VA module returning the SIP INVITE message to the SIP INVITE generator through said AE module and said RTC module, said SIP INVITE generator logging returned messages in a log, the log containing returned message time stamps that can be analyzed to measure the delay characteristics;

a web server module; and a database module, said web sever module and said database module consuming CPU/Memory resources at a rate and amount specified in said module definition.

12. A telecommunications system in accordance with claim 11, further including a directory defining a name and parameters of other modules being modeled by said system which a given module needs to work with.

13. A telecommunications system in accordance with claim 12 said modules including a loop module for modeling a non-real-time component.

14. A telecommunications system in accordance with claim 13, one or more modules defining a CPU load.

15. A telecommunications system in accordance with claim 13, one or more modules defining a system delay.

* * * * *